July 24, 1923.
H. L. CARNAHAN
ACCELERATOR FOOT THROTTLE
Filed Feb. 28, 1921
1,463,115
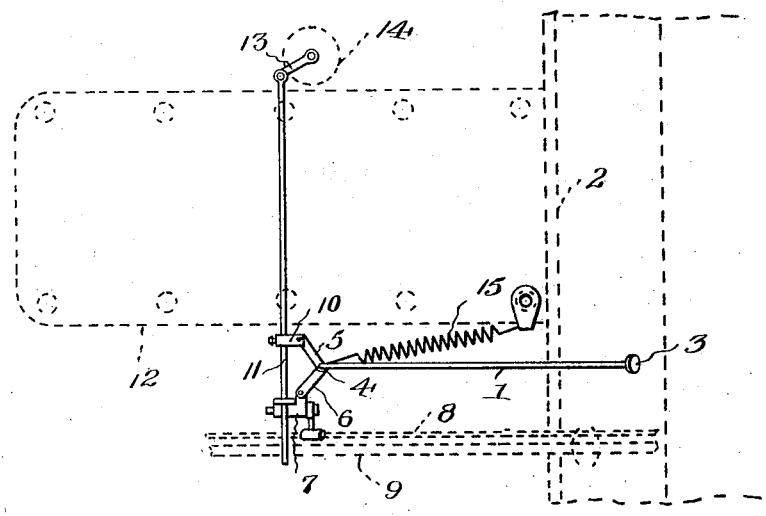
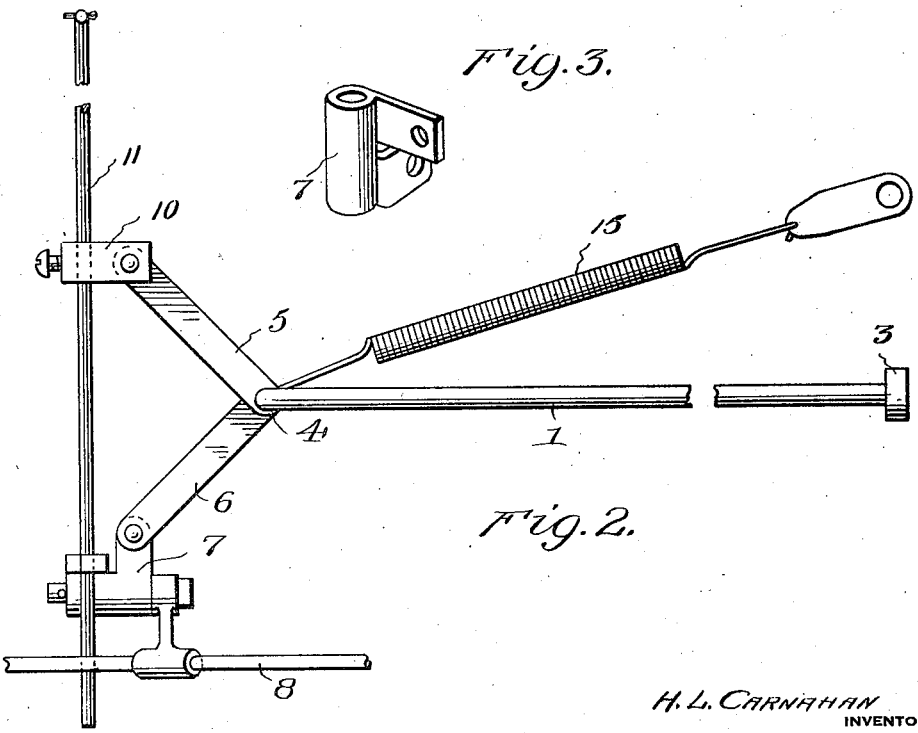
H. L. CARNAHAN
INVENTOR
BY *Victor J. Evans*
ATTORNEY Patented July 24, 1923.

1,463,115

UNITED STATES PATENT OFFICE.

HARRY LENDELL CARNAHAN, OF CENTRALIA, MISSOURI.

ACCELERATOR FOOT THROTTLE.

Application filed February 28, 1921. Serial No. 448,597.

*To all whom it may concern:*

Be it known that I, HARRY LENDELL CARNAHAN, a citizen of the United States, residing at Centralia, in the county of Boone and State of Missouri, have invented new and useful Improvements in Accelerator Foot Throttles, of which the following is a specification.

This invention relates to accelerator foot throttles for use in connection with the throttle of carburetor control of motor vehicle engine and an object of the invention is to provide means for effectively controlling the speed of an engine by the action of the driver's foot against a foot pedal located in a convenient position on the floor of the motor vehicle.

Another object of the invention is to provide a device of this nature which is designed to overcome the supersensitiveness of devices of this character and permit slow starting opening of the carburetor valve to permit better adjustment of the throttle at the starting of the engine and also to provide a device of this nature which does not interfere in any way with the action of the usual hand throttle employed upon motor vehicles.

Other objects of the invention will appear in the following detailed description and in the accompanying drawings wherein:

Fig. 1 is a fragmentary section through the motor vehicle showing the improved accelerator foot throttle applied.

Fig. 2 is a top plan of the accelerator for throttle structure.

Fig. 3 is a detail perspective view of a coupling used in the improved foot throttle.

Referring more particularly to the drawing the improved accelerator foot throttle structure comprises a control rod 1, which extends through the instrument or dash board 2 of a motor vehicle and which has a pedal 3, of any suitable construction, mounted upon its end adjacent the floor of the motor vehicle to permit operation of the rod 1 by the foot of the driver of the vehicle. The end of the rod 1, remote from the pedal 3, is pivotally connected by means of a suitable bolt or analagous coupling 4, to arms 5 and 6. The arm 6 is pivotally connected to a coupling 7 which is attached to the carburetor control rod 8 of the steering post structure 9 of the vehicle, and the link or arm 5 is pivotally connected to a collar 10 which is fixed upon a rod 11. The rod 11 extends across the engine or motor 12 of the vehicle and is connected to the butterfly valve 13, which controls the inlet or fuel to the carburetor 14 of the engine 12. The rod 11 is slidably supported by the coupling 7. A spring 15 has one end fixed and the other end connected at the point of juncture of the rod 1 with the arm so as to normally tend to return the parts to normal position and to steady the action of the accelerator.

From the foregoing description, taken in connection with the accompanying drawings, it will be apparent that when the rod 1 is moved or forced inwardly it will rock the links 5 and 6 and in so doing will move the rod 11 longitudinally thereby regulating the butterfly valve 13. When pressure is relieved from the pedal 3 of the rod 1 spring 15, which is tensioned by the forced operation of the rod, will reflex, and return rod 1, links 5 and 6 and rod 11 to their normal positions.

It is, of course, to be understood that the invention may be constructed in various other manners and the parts associated in different relations and, therefore, I do not desire to be limited in any manner except as set forth in the claims hereunto appended.

Having thus described my invention what I claim is:

1. In a foot accelerator for controlling throttle movement of an engine, a control rod, a throttle operating rod, links connected to said control rod, one of said links limited to a pivotal movement, the other of said links being fixed to said throttle operating rod for operating same upon movement of the control rod, a return spring connected to said links for returning the throttle operating rod, links and control rod to normal position, said spring arranged to provide steadying resistance to the operation of said control and throttle rods.

2. In a foot accelerator for controlling throttle movement of an engine, a rigid supporting coupling, a link pivoted to said coupling, a throttle operating rod, a collar adjustably mounted upon said throttle operating rod, a second link pivoted to said collar and said first named link, and a foot operated control rod pivotally connected to said links at their point of connection, and a return spring connected to said rod.

3. A foot accelerator comprising in combination a carbureter control rod, a coupling slidably supporting one end portion of the rod, a collar slidably mounted on the rod and adapted to be fixed in an adjustable position upon the rod, and a second control rod, and a link connection between the control rod and collar and between the control rod and coupling.

4. A foot accelerator comprising in combination a carbureter control rod, a coupling slidably supporting one end portion of the rod, a collar slidably mounted on the rod and adapted to be fixed in an adjustable position upon the rod, a second control rod, and a link connection between the control rod and collar and between the control rod and coupling, said link connection consisting of a pair of links having an agular relation at all times.

In testimony whereof I affix my signature.

HARRY LENDELL CARNAHAN.